(12) United States Patent
Boumsellek et al.

(10) Patent No.: US 10,957,527 B2
(45) Date of Patent: Mar. 23, 2021

(54) MASS ANALYZER

(71) Applicant: ATONARP INC., Tokyo (JP)

(72) Inventors: Said Boumsellek, Fremont, CA (US); Prakash Sreedhar Murthy, Tokyo (JP); Dave Anderson, Fremont, CA (US)

(73) Assignee: Atonarp Inc., Tokyo (JP)

( * ) Notice: Subject to any disclaimer, the term of this patent is extended or adjusted under 35 U.S.C. 154(b) by 0 days.

(21) Appl. No.: 16/482,731

(22) PCT Filed: Apr. 4, 2018

(86) PCT No.: PCT/JP2018/014441
§ 371 (c)(1),
(2) Date: Aug. 1, 2019

(87) PCT Pub. No.: WO2018/186446
PCT Pub. Date: Oct. 11, 2018

(65) Prior Publication Data
US 2020/0227247 A1    Jul. 16, 2020

Related U.S. Application Data

(60) Provisional application No. 62/481,171, filed on Apr. 4, 2017.

(51) Int. Cl.
*H01J 49/00* (2006.01)
*H01J 49/42* (2006.01)
*G01N 27/62* (2021.01)

(52) U.S. Cl.
CPC ........... *H01J 49/421* (2013.01); *G01N 27/62* (2013.01); *H01J 49/0031* (2013.01)

(58) Field of Classification Search
USPC ........................................................ 250/282
See application file for complete search history.

(56) References Cited

U.S. PATENT DOCUMENTS 5,401,962 A     3/1995  Ferran
5,783,824 A *   7/1998  Baba ................... H01J 49/423
                                                250/281

(Continued)

FOREIGN PATENT DOCUMENTS

WO    2014150040 A2    9/2014
WO    2014150050 A1    9/2014

OTHER PUBLICATIONS

International Search Report (PCT/ISA/210) dated Jun. 12, 2018, by the Japanese Patent Office as the International Searching Authority for International Application No. PCT/JP2018/014441.

(Continued)

*Primary Examiner* — Phillip A Johnston
(74) *Attorney, Agent, or Firm* — Buchanan Ingersoll & Rooney PC

(57) ABSTRACT

A mass analyzer for scanning sample gases is disclosed. The mass analyzer comprises an ionizer for generating ions from a sample; a mass filter with an accumulator section integrated in the mass filter and accumulates filtered ions prior to ejecting from the mass filter; and an ion detector that is configured to detecting ejected ions from the mass filter. The mass filter may include a quadrupole array and the accumulator section includes an ion trap array.

20 Claims, 7 Drawing Sheets

(56) References Cited

U.S. PATENT DOCUMENTS

| | | | | |
|---|---|---|---|---|
| 6,762,406 | B2* | 7/2004 | Cooks | H01J 49/0013 |
| | | | | 250/291 |
| 8,003,934 | B2* | 8/2011 | Hieke | G21K 5/02 |
| | | | | 250/288 |
| 8,445,845 | B2* | 5/2013 | Green | H01J 49/4265 |
| | | | | 250/292 |
| 8,916,819 | B2* | 12/2014 | Makarov | H01J 49/0031 |
| | | | | 250/282 |
| 9,455,132 | B2* | 9/2016 | Mordehai | H01J 49/062 |
| 2004/0108450 | A1 | 6/2004 | Makarov et al. | |
| 2004/0135080 | A1 | 7/2004 | Ouyang et al. | |
| 2008/0067362 | A1 | 3/2008 | Senko | |
| 2008/0121795 | A1 | 5/2008 | Sugiyama et al. | |
| 2009/0230301 | A1 | 9/2009 | Furuhashi et al. | |
| 2011/0049358 | A1 | 3/2011 | Green et al. | |
| 2016/0071709 | A1 | 3/2016 | Hendricks | |

OTHER PUBLICATIONS

Written Opinion (PCT/ISA/237) dated Jun. 12, 2018, by the Japanese Patent Office as the International Searching Authority for International Application No. PCT/JP2018/014441.

Extended European Search Report issued in corresponding European Patent Application No. 18781657.4, dated Dec. 7, 2020 (11 pages).

* cited by examiner

[Fig. 1]
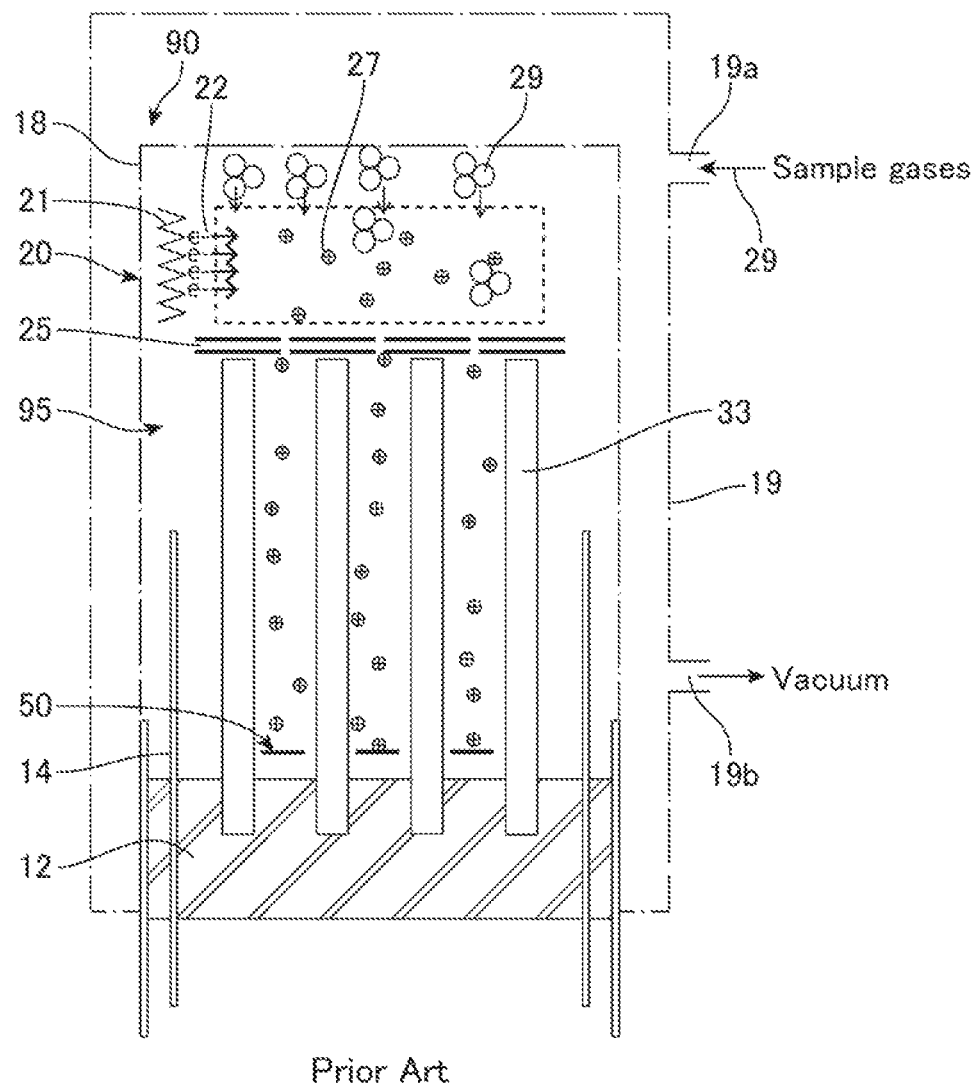
Prior Art

[Fig. 2]
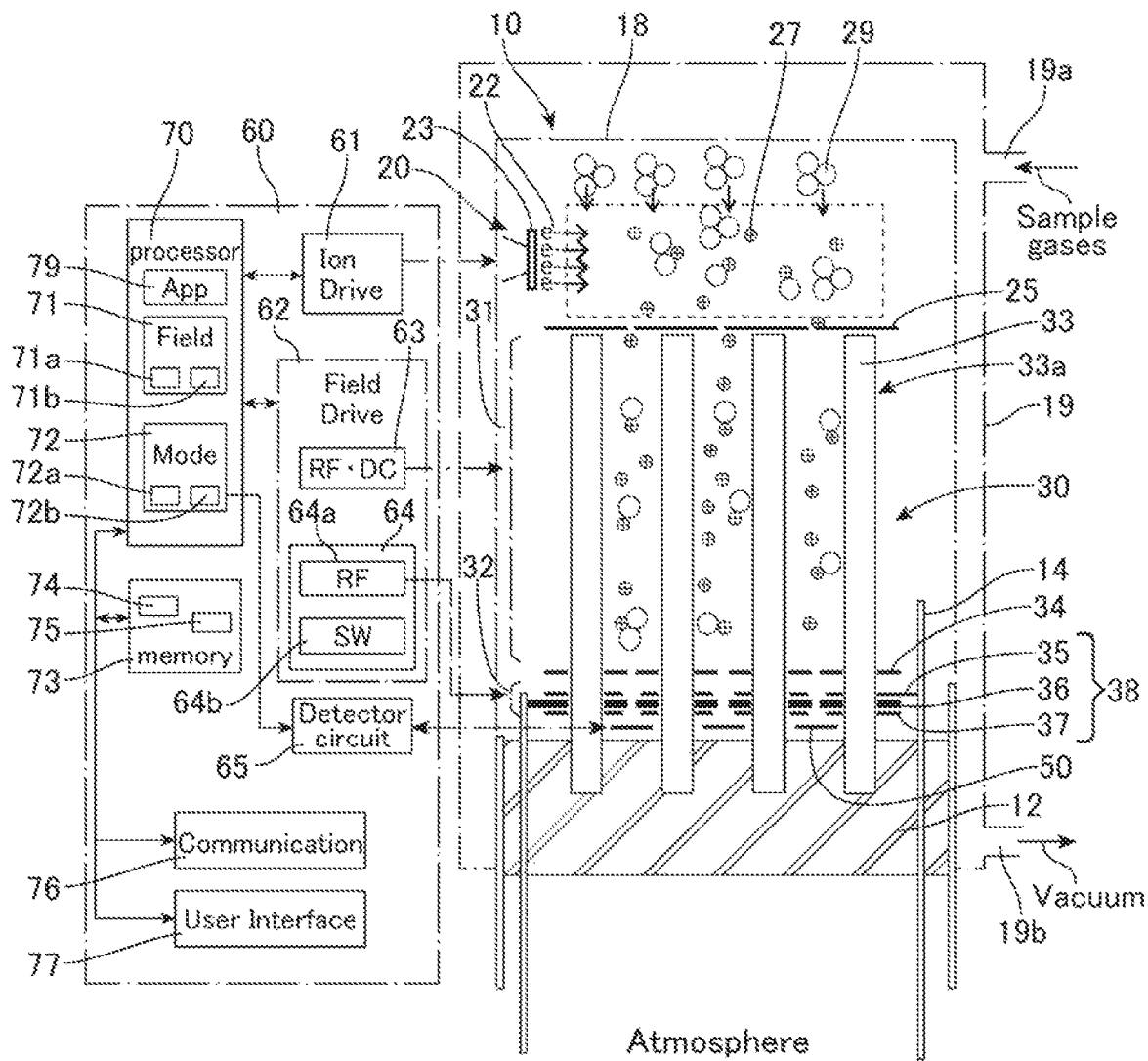

[Fig. 3]
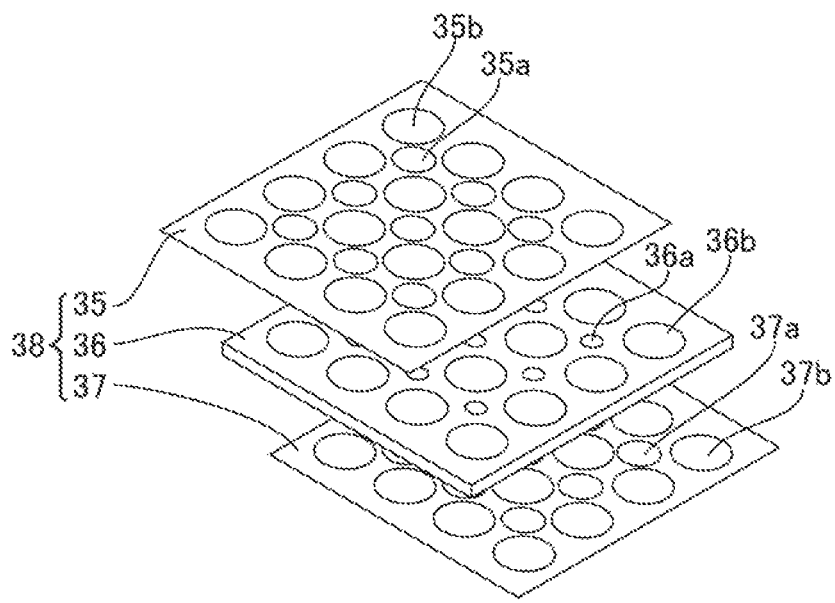
[Fig. 4]
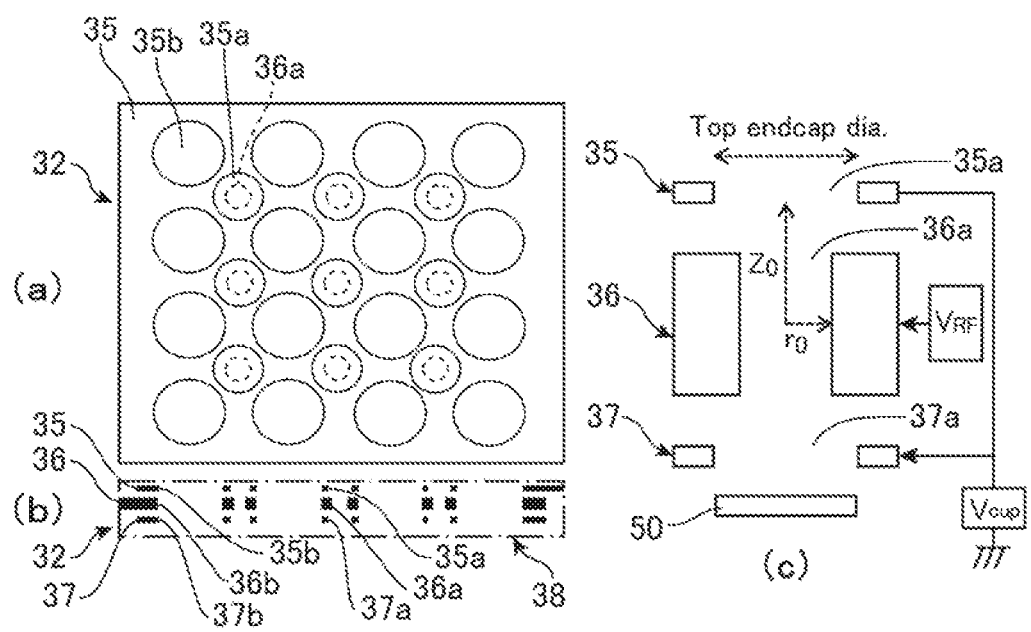

[Fig. 5]
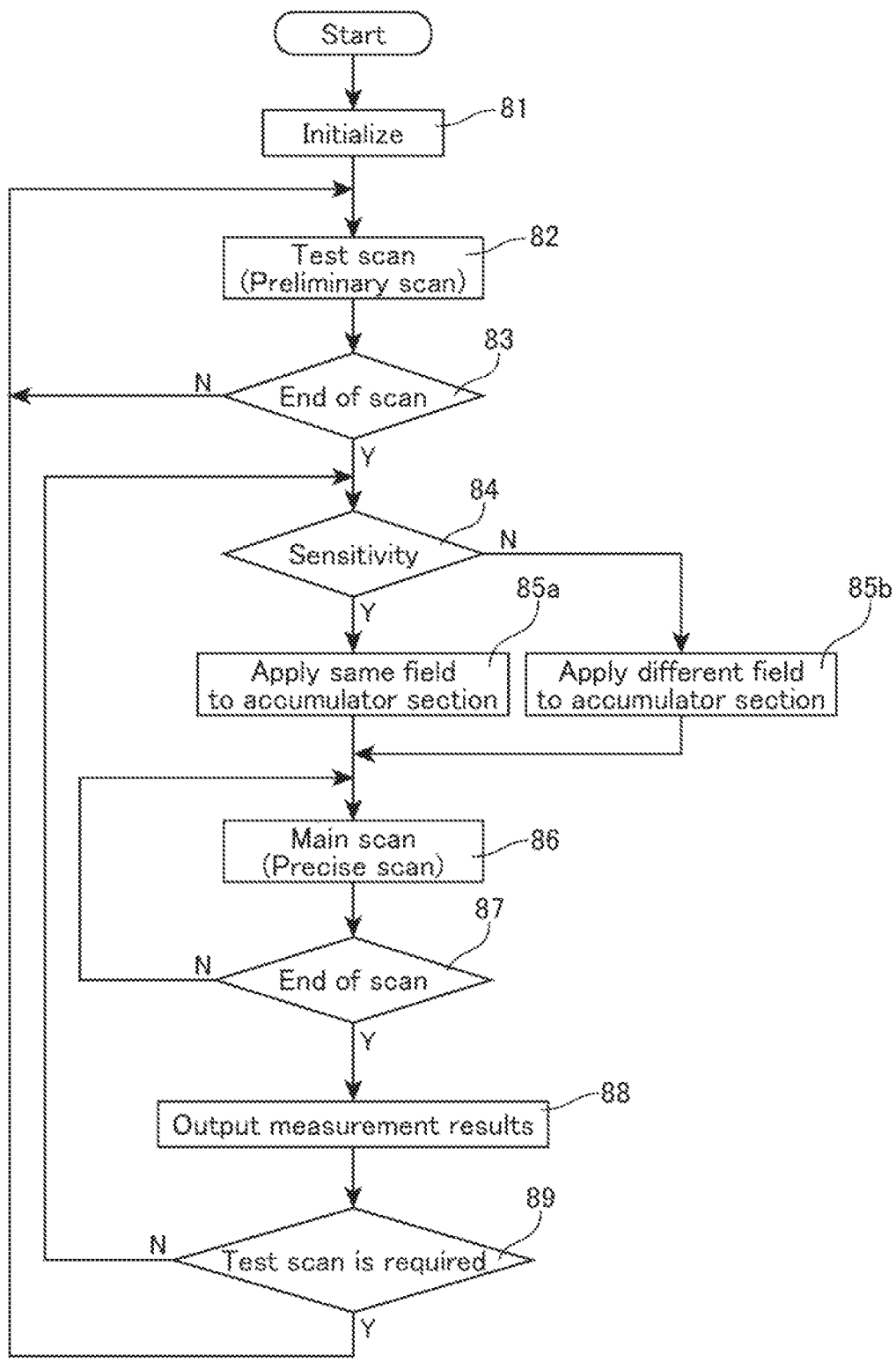

[Fig. 6]
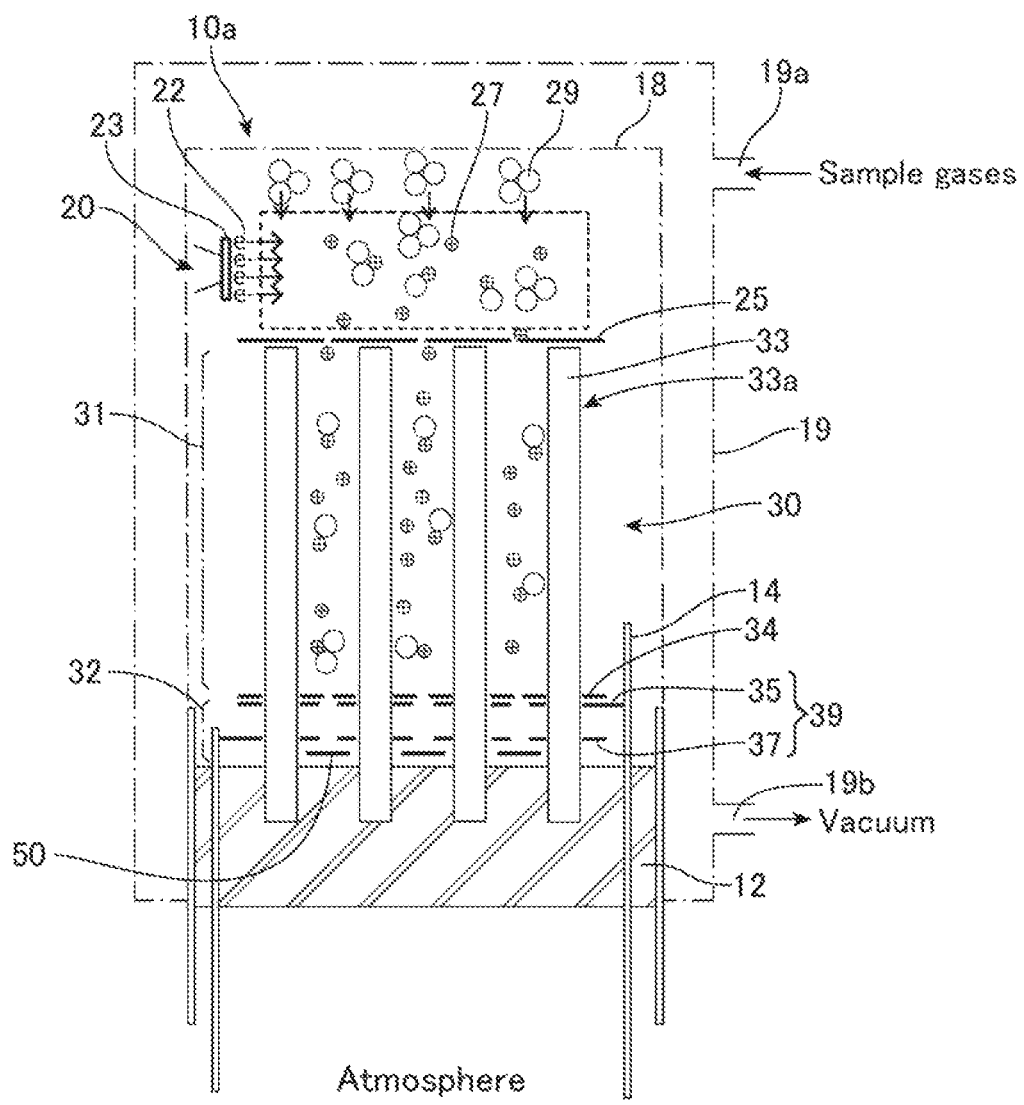

[Fig. 7]
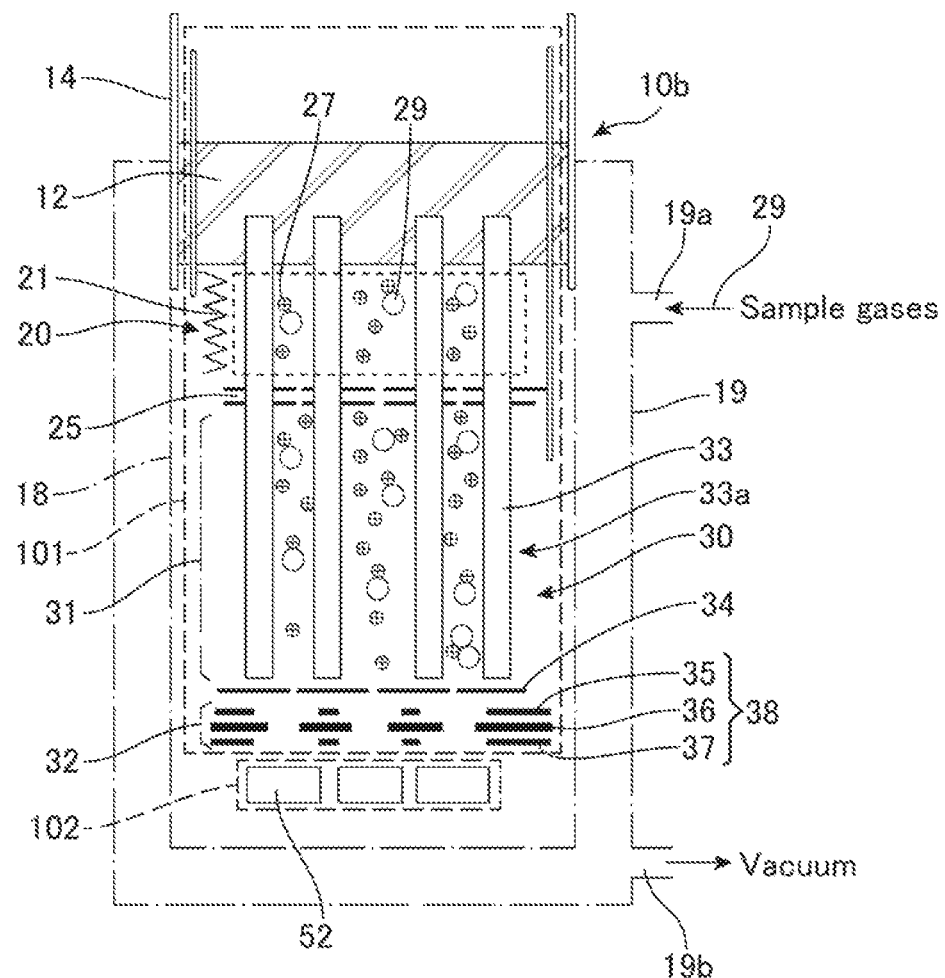
[Fig. 8]
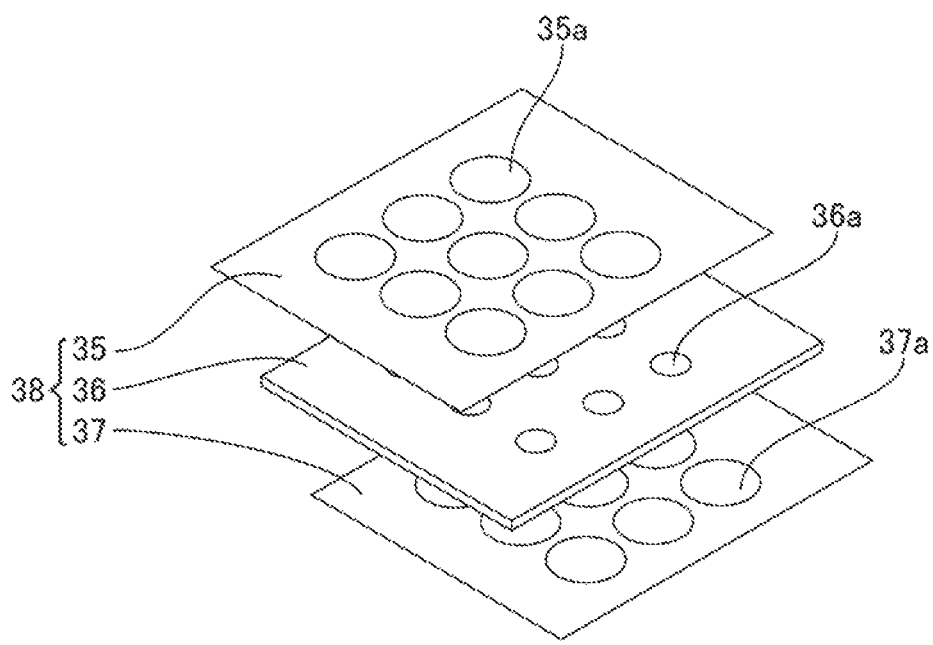

[Fig. 9]
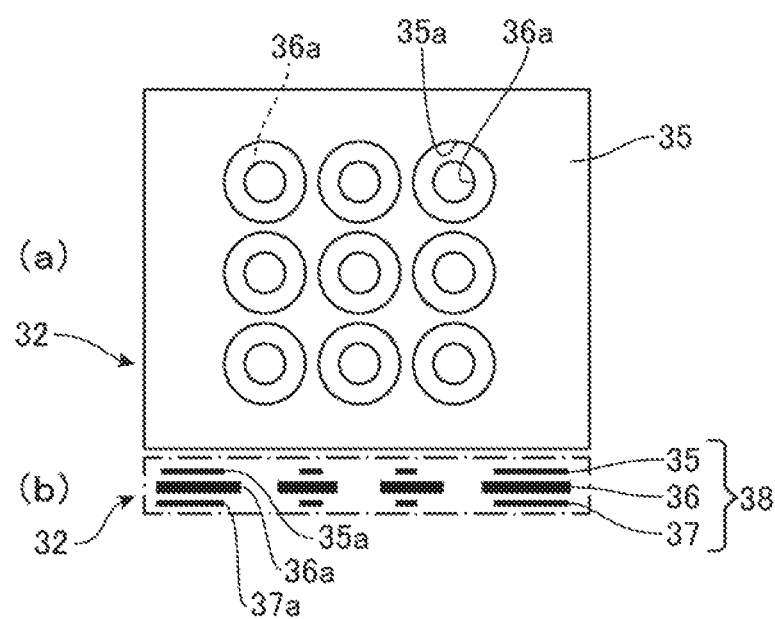

MASS ANALYZER

TECHNICAL FIELD

The inventions generally relate to a miniaturized highly integrated mass analyzer.

BACKGROUND ART

In a publication WO2014/150040, a hybrid mass spectrometer design and architecture, and methods of operating mass spectrometers are disclosed. The hybrid mass spectrometer has an ion source, a mass selector, and an elongated collision cell that receives ions from the mass selector through a first end. A controller, coupled to the collision cell, is programmed with logic for selectably releasing accumulated ions from the first end of the collision cell to a first mass analyzer (e.g., an electrostatic ion trap) or from a second end of the collision cell to a second mass analyzer (e.g., a two-dimensional quadrupole ion trap). Both the first and second mass analyzers are positioned out side of an ion path extending from the ion source to the collision cell, such that ions may be conveyed to and accumulated in the collision cell concurrently with the acquisition of mass spectra by one or both mass analyzers.

SUMMARY OF INVENTION

Conventional methods relative to this technical field teach the juxtaposition or hyphenation of analysis stages for the purpose of enhancing selectivity. This is often achieved at the detriment of sensitivity. Each analysis stage is usually a standalone instrument and is assembled in series with others to provide 2D and 3D separation to obtain enhanced overall resolving power. In addition, such system having multi analysis stages assembled in series is large in size and not convenient for field application.

Accordingly, there remains a need for a miniaturized mass analyzer having high sensitivity and selectivity for field applications and other applications.

One of aspect of this invention is a mass analyzer that comprises an ionizer for generating ions from a sample, a mass filter with an accumulator section that is integrated in the mass filter and accumulates filtered ions prior to ejecting from the mass filter, and an ion detector that is configured to detecting ejected ions from the mass filter. In this mass analyzer, spatial and temporal ion accumulator is built into the mass filter thus offering superior sensitivity and selectivity as well as mode of operation flexibility.

The mass filter may include a quadrupole array. The accumulator section may include an ion trap array. The ion trap array may include a cylindrical ion trap array. The cylindrical ion trap array may include a top endcap plate, a ring electrode plate and a bottom endcap plate. Rods of the quadrupole array may act as ring electrodes of the ion trap array.

The mass analyzer may further comprise a module that is configured to control the mass analyzer in two modes. The first mode of the two modes is ejecting the filtered ions through the accumulating section without accumulating prior to ejecting from the mass filter, and the second mode of the two modes is accumulating the filtered ions in the accumulator section prior to ejecting from the mass filter.

The mass analyzer may further comprise a module that is configured to provide a same electric or magnetic field to the accumulator section as that provided to the mass filter. The mass analyzer further comprises a module that is configured to provide a different electric or magnetic field to the accumulator section than that provided to the mass filter. A quadrupole array of the mass filter and an ion trap array of the accumulator section may operate with the same or different RF frequencies and voltages.

The mass analyzer may further comprise a chassis that is configured to integrate the ionizer, the mass filter and the ion detector. The mass analyzer may further comprise a modular component that is configured to assemble any one of the ionizer, the mass filter and the ion detector. The modular component may be changeable at assembling. The modular component may be the accommodation of detectors such as Faraday detectors, electron multipliers (EM), microchannel plates (MCP), CCDs, and photomultiplier tubes (PMT). Typical ion detector may be a Faraday detector.

Another aspect of this invention is a system that comprises the mass analyzer according to the above, and a module that is configured to use an output from the mass analyzer. The module may include an output unit that is configured to output an information relating to the sample detected by the mass analyzer. The system and/or the mass analyzer may be integrated into industrial (semiconductor chip manufacturing, vacuum coating, drug discovery, petrochemical etc.) tools needed for real time monitoring and control in several inline applications.

Yet another aspect of this invention is a method that includes controlling a mass analyzer. The mass analyzer comprises an ionizer for generating ions from a sample, a mass filter with an accumulator section integrated therein, an ion detector for detecting ejected ions from the mass filter, and a controller that is configured to control an electric and/or magnetic field to be provided to the mass filter and the accumulator section. The controlling the mass analyzer includes a step of accumulating, using the controller, filtered ions in the accumulator section prior to ejecting from the mass filter.

The controlling the mass analyzer may further include a step of ejecting, using the controller, the filtered ions through the accumulating section without accumulating prior to ejecting from the mass filter.

The controlling the mass analyzer may further include a step of providing, using the controller, a same electric or magnetic field to the accumulator section as that provided to the mass filter. The controlling the mass analyzer may further include a step of providing, using the controller, a different electric or magnetic field to the accumulator section than that provided to the mass filter.

The method may further include steps of (i) performing a first scan of a set of mass to charge ratios (m/z) using the mass analyzer with a first mode including the ejecting; and (ii) performing a second scan of the set of mass to charge ratios using the mass analyzer with a second mode including the accumulating.

Yet another aspect of this invention is a computer program (program product) for a computer to operate a system including a mass analyzer. The mass analyzer comprises an ionizer for generating ions from a sample, a mass filter with an accumulator section integrated in the mass filter, and an ion detector for detecting ejected ions from the mass filter. The computer program includes executable codes for performing steps of (i) a first scan of a set of mass to charge ratios using the mass analyzer with a first mode including ejecting filtered ions through the accumulating section without accumulating prior to ejecting from the mass filter; and (ii) a second scan of the set of mass to charge ratios using the mass analyzer with a second mode including accumulating the filtered ions in the accumulator section prior to ejecting from the mass filter. A non-transitory computer readable medium storing the above program (program product, software) for controlling operation, detection and analysis processes of the system is also included in this invention.

BRIEF DESCRIPTION OF DRAWINGS

The embodiments herein will be better understood from the following detailed description with reference to the drawings, in which:

FIG. 1 illustrates an example of one of conventional mass analyzers as a prior art;

FIG. 2 illustrates one embodiment of a mass analyzer in accordance with the invention;

FIG. 3 illustrates a configuration of an ion trap array of the mass analyzer shown in FIG. 2;

FIG. 4($a$) is a top view of the ion trap array shown in FIG. 3; FIG. 4($b$) is a schematic configuration of the ion trap array; FIG. 4($c$) is a schematic configuration of an ion trap extracted from the ion trap array;

FIG. 5 is a flow diagram that illustrates a process for measurement using the mass analyzer shown in FIG. 2;

FIG. 6 illustrates another embodiment of a mass analyzer in accordance with the invention;

FIG. 7 illustrates yet another embodiment of a mass analyzer in accordance with the invention;

FIG. 8 illustrates a configuration of an ion trap of the mass analyzer shown in FIG. 7;

FIG. 9($a$) is a top view of the ion trap array shown in FIG. 8; FIG. 9($b$) is a schematic configuration of the ion trap array.

DESCRIPTION OF EMBODIMENTS

FIG. 1 depicts a device referenced herein as Prior Art. The device shown on FIG. 1 is a miniature mass analyzer (mass spectrometer) 90 that includes a miniature quadrupole type mass filter 95 whereby rods 33 are aligned and held in a glass chassis 12. The mass filter 95 features an array of quadrupoles multiplexed to operate in parallel to partially recover signal loss due to miniaturization. Typical mass analyzer 90 is outfitted with a permanently assembled conventional dual filament 21 based electron impact ionizer 20, electrostatic lenses (source slit) 25, the mass filter 95, ion collectors 50, pins for electrical connection 14 and sensor housing 18 for housing these as one device or one piece. Typical sizes of housing 18 are about 1-2 cm in diameter and about 2-5 cm in length. The mass analyzer 90 can be inserted or installed in a small chamber 19, a pipe or a vessel that has an inlet 19$a$ for supplying sample gases 29 and an outlet 19$b$ for evacuating the chamber 19 by a vacuum pump (not shown). In the mass analyzer 90, molecules of sample gases are ionized by the electrons 22 emitted from the filament 21 of the ionizer 20. The ions 27 are introduced via the electrostatic lenses into the quadrupole mass filter 95 that includes, for example, 4×4 array of rods 33 in a matrix-like pattern. Separated ions by the mass filter 95 are reached on the ion collector, for example, faraday ion collector 50 and detected as an ion current.

For the ion collector 50, instead of the faraday ion collector, using electron multipliers (EMs) and/or microchannel plates (MCPs) are studied to enhance the sensitivity. Both filaments and EMs have limited lifetimes, due to the degradation of the surface layer (active element in the case of filaments and resistive coating in the case of EMs) making low cost and reliable long-term dependability as a challenge.

In fact, sensitivity and selectivity are sacrificed when dimensions are scaled down due to: 1. space charge limited ionizers, 2. smaller ion acceptance areas, and 3. difficulty in maintaining electrode alignment accuracy respectively. Electrode alignment is critical to producing pristine quadrupole fields for maximum resolving power.

Some embodiments herein are disclosed as examples of miniaturized highly integrated hybrid mass analyzers of this invention suitable for field applications. The invention represents a novel approach to enhancing performance and providing the robustness and the reliability required for long lasting field operation. The device and method of this invention combine spatial and temporal ion accumulating (trapping) built into the mass filter of the analyzer thus offering superior sensitivity and selectivity as well as mode of operation flexibility.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

FIG. 2 shows a preferred embodiment of a mass analyzer 10 and a system 1 including the mass analyzer 10 and a controller 60 that controls the mass analyzer 10 to perform various measurements required by applications. The system 1 may be a device or an apparatus for achieving a specific purpose or various objectives. The mass analyzer 10 is a miniaturized quadrupole type mass spectrometer (mass sensor) that includes an ionizer 20 for generating ions 27 from sample gases 29, a mass filter 30 with an accumulator section 32, and an ion detector 50 that is configured to detecting ejected ions from the mass filter 30. The accumulator section 32 is integrated in the mass filter 30 and accumulates filtered ions 27 prior to ejecting them from the mass filter 30 to the detector (ion collector) 50. The ionizer 20 is a long lifetime thermo-emission electron ionizer that includes one or more emitters 23 that are coated with thick layer of the low work function material such yttrium oxide, thorium oxide etc.

The mass analyzer 10 further includes a glass chassis 12 that aligns and holds rods 33 of the mass filter 30, pins for electrical connection 14 and a housing 18 that houses and covers the ionizer 20, mass filter 30 and detectors 50 in a state where the sampling gases 29 can pass through. The mass filter 30 includes a filtering section 31 where the rods 33, for example 4×4 or 3×3 rods 33 are arranged to configure a quadrupole array 33$a$ that acts as a quadrupole mass filter and selects ions by an electrical field, and the accumulator section 32 where plates 35, 36 and 37 are arranged to configure an ion trap array 38. The ion trap array 38 includes, in order from the filtering section 31 side, a top endcap plate 35, a ring electrode plate 36 and a bottom endcap plate 37 that configure a cylindrical ion trap array interfaced with the linear quadrupole array via an exit slit 34. The top endcap plate 35, the ring electrode plate 36 and the bottom endcap plate 37 include through holes respectively in which the rods 33 are inserted and the ion trap array 38 is fixed to the chassis 12 with the rods 33. Accordingly, the accumulator section 32 is integrated with the filtering section 31 in the mass filter 30 at the output side (exit side) of in the mass filter 30. The ions (filtered ions) 27 filtered by the filtering section 31 is accumulated in the accumulator section prior to ejecting them from the mass filter 30 to the ion detector 50.

In this mass analyzer 10, the linear quadrupole array 33a is interfaced with the cylindrical ion trap array 38 intended to operate at the same or different RF frequencies. While the linear quadrupole stage 33a (the filtering section 31) acts as a mass filter, the ion trap 38 (accumulator section 32) operates as an ion storage stage to accumulate ions for enhanced sensitivity. Upon reaching maximum storage capacity ions are ejected toward the detector 50. A single or several accumulation/ejection cycles can be performed to achieve ion signal amplifications comparable to those obtained with electron multiplication devices. Such a method enables the use of Faraday detectors 50 which possess unparalleled field attributes including ruggedness, infinite lifetime, no maintenance, and no calibrations.

FIGS. 3 and 4 illustrate the ion trap array 38 that configure the accumulator section 32 of the mass filter 30. The ion trap array 38 includes the top endcap plate (end cap electrode) 35, the ring electrode plate (ring electrode) 36 and the bottom endcap plate (end cap electrode) 37. One of methods of fabrication suitable for mass production of the hybrid mass analyzers 10 uses accurate photoetched electrode parts. The plates 35-37 can be fabricated using the photoetching technology. The top endcap plate 35 includes a plurality of through holes 35a for configuring ion gates of the ion trap, and a plurality of through holes 35b for inserting rods 33. The ring electrode plate 36 includes a plurality of through holes 36a for configuring ring electrodes to trap ions, and a plurality of through holes 36b for inserting rods 33. The bottom endcap plate 37 includes a plurality of through holes 37a for configuring ion gates (exit gates) of the ion trap, and a plurality of through holes 37b for inserting rods 33. As illustrated in FIG. 4 (c), a cap field Vcap is applied to the endcap plates 35 and 37 to control the accumulation cycles of ion trap 38, a RF field Vrf is applied to the ring electrode plate 36 to generate a field for trapping ions therein. The ion traps 38 shown in this embodiment are the quadrupole ion traps (radio frequency traps or Paul traps) that are suitable to be integrated in the quadrupole mass filter 30, but other type of traps such as Kington traps, penning ion trap and others can be used for accumulating ions.

The controller (control unit, control board) 60 communicates with the ionizer 20, the mass filter 30 and the ion collector 50 of the mass analyzer 10 via the pins for electrical connection 14 for controlling the mass analyzer 10 and acquiring data or information from the mass analyzer 10 to perform various measurements. The controller 60 includes an ion drive circuit 61 that electrically drives the ionization unit 20; a field drive circuit that electrically drives the filter unit (mass filter) 30; a detector circuit that controls the sensitivity of the detector unit 50, a processor 70 for operating the system 1 that includes controller 60 and the mass analyzer 10, memory 73, a communication module 76 and a user interface 77. The controller 60 may be a user of the mass analyzer 10 to use an output from the mass analyzer 10.

The ion drive circuit 61 may include a circuit for measures a filament voltage and a filament current, and a circuit for control the filament voltage. The field drive circuit 62 includes a first field drive unit 63 that electrically drives the quadrupole field of the quadrupole array 33a of the filtering section 31 and a second field drive unit 64 that electrically drives the ion trap array 38 of the accumulator section 32.

The first field drive unit 63 controls the electrical field of the filtering section 31 individually using RF (frequency) and DC, and the second field drive unit 64 controls the electrical field of the accumulator section 32 individually using RF.

The second field drive unit 64 includes an RF control unit 64a and gate control unit (SW unit) 64b that controls the accumulation cycles (trapping cycles) of the trap 38 of the accumulator section 32. The second field drive unit 64 can control the ion trap array 38 of the accumulator section 32, using the RF control unit 64a and the SW unit, in two modes, wherein the first mode of the two modes is ejecting the filtered ions through the accumulating section 32 without accumulating prior to ejection from the mass filter 30, and the second mode of the two modes is accumulating the filtered ions in the accumulator section 32 prior to ejection from the mass filter 30.

The processor 70 is a system such as a CPU, a microcontroller, a signal processor, a field-programmable gate array (FPGA) and the like. In the processor 70, applications 79 and functional modules 71 and 72 supplied by programs (computer program, program products, software) 74 stored in the memory 73 such as ROM that is one of non-transitory computer readable mediums, are implemented. The programs 74 includes executable codes for performing functions and algorithm of the applications 79 and modules 71 and 72 by the processor 70. The processor 70 includes a field control module 71 and a mode control module 72. The field control module 71 includes a module 71a that is configured to provide a same electric field to the accumulator section 32 as that provided to the mass filter section via the field drive circuit 62 and a module 71b that is configured to provide a different electric field to the accumulator section 32 than that provided to the mass filter section 31. That is, the module 71a controls the first field drive unit 63 and the second field drive unit 64 to drive the quadrupole field of the quadrupole array 33a of the filtering section 31 and to drive the ion trap array 38 of the accumulator section 32 using the same RF (frequency) for accumulating the same filtered ions that makes increasing the sensitivity of the mass filter 30. The module 71b controls the first field drive unit 63 and the second field drive unit 64 to drive the quadrupole field of the quadrupole array 33a of the filtering section 31 and to drive the ion trap array 38 of the accumulator section 32 using the different or slightly different RF (frequency) for accumulating and re-selecting the filtered ions that makes increasing the selectivity of the mass filter 30.

The mode control module 72 includes a module 72a that is configured to control the mass analyzer 10 in the first mode where the accumulator section 32 is non-active and a module 72b that is configured to control the mass analyzer 10 in the second mode where the accumulator section 32 is active. That is, the module 72a controls the second field drive unit 64 to stop the trapping action of the ion trap array 38 in the accumulator section 32 so as to eject the filtered ions selected in the filtering section 31 through the accumulating section 32 without accumulating. Such operation is effective for a test scan, a preliminary or provisional search (faster search) for a set of m/z (a series of mass to charge ratios) because the accumulating times are not required, and a wider search can be done in a short time.

The module 72b controls the second field drive unit 64 to active the trapping action of the ion trap array 38 in the accumulator section 32 so as to accumulate the filtered ions in the accumulator section 32 prior to ejecting them from the mass filter 30. This operation is suitable for a precise search performed after the preliminary search by increasing the sensitivity of the mass analyzer 10. The mode control module 72 may change the modes in m/z-by-m/z basis according to the preliminary search result 75 stored in the memory 73. When a concentration (intensity, ion current) of the composition X (m/z is x) of the sample gases 29 is low, the mode control module 72 may select the second mode using module 72b to accumulate the composition X to increase the sensitivity. When a concentration of the composition Y (m/z is y) of the sample gases 29 is high, the mode control module 72 may select the first mode using module 72a to eject the composition Y without accumulating to save the measuring time. The mode control module 72 may change the accumulating times (accumulating periods, accumulating durations, trapping cycles) of the accumulator section 32 for each m/z to have both merits of accuracy and measurement time.

The application 79 may control the mass analyzer 10 via the field control module 71, the mode control module 72, the ion drive circuit 61 and/or the filed drive circuit 62 as followings.

(i) controlling ionizing of a sample 29 entering the mass analyzer device 10;

(ii) scanning at least one set of RF voltages for the operation of the quadrupole filtering section 31 and ion trap stages 32 of the hybrid mass analyzer device 10; and (iii) controlling at least one voltage pulse of the bottom endcap electrode 37 of the ion trap 38 (32), wherein controlling selectively gated ions for accumulation prior to collection by an ion detector 50 coupled downstream from the ion trap stage 32 of the hybrid mass analyzer. 10.

The application 79 may perform the preliminary search (test scan, first scan) and the precise search (second scan) for the same set of m/z periodically and output the result of searches using the communication unit 76 and the user interface (U/I) 77. U/I 77 is one of output units that may include a display for outputting measurement results relating to the sample gases 29, a touch panel for setting conditions of measurement to be performed by the mass analyzer 10, and audio equipment for outputting alarms. The communication unit 76 is another one of output units that may be connected by wire or by way of an appropriate wireless communication technology, such as Wi-Fi connection, wireless LAN, cellular data connection, Bluetooth® or the like to an external system via the Internet or other computer networks to monitor and/or remote control the system 1.

FIG. 5 is a flow diagram that illustrates a process for scanning a set of m/z to measure or monitor compositions of the sample gases 29. At step 81, the application 79 initializes the system 1 and sets the conditions for measuring the sample gases 29. The initial condition may include a set of mass to charges m/z for scan, periods of continuing search, number of times to repeat the scan, condition to repeat the test search and the like. At step 82, by using the mode control module 72, the preliminary test scan (first scan) with the first mode is performed. In step 82, the test scan (first scan) of the set of mass to charge ratios is performed using the mass analyzer 10 with a first mode. In the first mode, filtered ions are ejected through the accumulating section 32 without accumulating prior to ejecting from the mass filter 30.

At step 83, when the test scan ends, preparation for the precise scan (main scan) is performed. At step 84, if sensitivity is required rather than selectivity for the main scan, at step 85a, the first module 71a of the field control module 71 sets the first field drive unit 63 and the second field drive unit 64 to provide the same electric fields with the same RF to the filter section 31 and the accumulator section 32. if selectivity is required rather than sensitivity for the main scan, at step 85b, the second module 71b of the field control module 71 sets the first field drive unit 63 and the second field drive unit 64 to provide different electric fields with the different RF to the filter section 31 and the accumulator section 32.

At step 86, by using the mode control module 72, the precise scan (main scan, second scan) with the second mode is performed. In step 86. The main scan (second scan) of the set of mass to charge ratios using the mass analyzer 10 with a second mode. In the second mode, the filtered ions outputted from the filtering section 31 are accumulated in the accumulator section 32 prior to ejecting from the mass filter 30. When the main scan ends at step 87, the application 79 outputs the measurement result via the communication unit 76 and/or the U/I 77 in step 88. After the main scan is performed, at step 89, if the test scan is required prior to start of the next main scan, at the step 82, next test scan is performed. Test scan may be periodically performed to confirm the condition of the sample gases 29. The test scan may also be performed periodically using test gases where the compositions and concentrations are known beforehand.

FIG. 6 illustrates another embodiment of a mass analyzer in accordance with the invention. The mass analyzer 10a is also a miniaturized quadrupole type mass spectrometer (mass sensor). The mass analyzer 10a includes an ionizer 20, a mass filter 30 with an accumulator section 32, and an ion detector 50, which are integrated on a glass chassis 12 and enclosed by a cover 18. The accumulator section 32 is integrated in the mass filter 30 and accumulates filtered ions 27 prior to ejection from the mass filter 30 to the detector 50. Microtraps 39 are configured in the accumulator section 32 by a top endcap plate 35, rods 33 that are shared with the quadrupole mass filter section 31, and a bottom endcap plate 37. In this mass filter 30, the multiple quadrupoles rods 33 arranged for making an array such as 3×3, 4×4 and others, configure the quadrupole array 33a for the filter section 31 and the quadrupole ion trap array 39 for the accumulator section 32. The microtraps 39 are rectilinear traps for much higher storage capacity. This is achieved using the quadrupoles rods 33 as ring electrodes to trap ions in rectilinear traps 39 over a variable distance. Such embodiment enables higher storage capacity in the accumulator section 32 and therefore higher sensitivity for the same accumulation/ejection cycles.

FIG. 7 illustrates yet another embodiment of a mass analyzer in accordance with the invention. The mass analyzer 10b is also a miniaturized quadrupole type mass spectrometer and includes an ionizer 20, a mass filter 30 with an accumulator section 32, and an ion detector 52. In this mass analyzer 10b, the ionizer 20 and the filter section 31 of the mass filter 30 integrated on a glass chassis 12 and the cylindrical ion trap array 38 disposed at the tip end of the quadrupoles rods 33 separately from the rods 33 for configuring the accumulator section 32 constitute a first modular component 101, and the ion collector array 52 constitute a second modular component 102. The components 101 and 102 are assembled and enclosed by a cover 18 to configure the mass analyzer 10b. The construction method disclosed in this invention relies on assembling modular components resulting in various embodiments. In fact, this embodiment enables the accommodation of detectors such as electron multipliers (EM), microchannel plates (MCP), CCDs, and photomultiplier tubes (PMT). The ion source 20 is assembled at the other end of the analyzer chassis 12 to clear the way for such detectors to be interfaced.

FIGS. 8 and 9 illustrate the ion trap array 38 of this mass analyzer 10b that configures the accumulator section 32 of the mass filter 30. Plates 35, 36 and 37 that constitute the ion trap array 38 are photoetched electrode parts. Since the ion trap array 38 is disposed in the mass filter 30 separated from the quadrupoles rods 33, it is not necessary to provide holes for inserting the rods 33 on the plates 35-37. Therefore, the gate holes 35a and 37a on the endcap plate 35 and 37, and the ring electrode holes 36a on the electrode plate 36 may be arranged to maximize the capacities of the ion traps configured in the ion trap array 38. In addition, since the electrode plate 36 for generating holding electric field is separated from the quadrupole rods 33, the same or different electrical field than the filtering section 31 can be easily applied to the ion trap array 38 of the accumulating section 32. Such embodiment enables higher storage capacity and field controllability therefore higher sensitivity and selectivity for the same accumulation/ejection cycles.

The miniaturized quadrupole type mass spectrometers 10, 10a and 10b may also be provided as a monolithic device or a chip using MEMS technology and/or semiconductor technology. The miniaturized quadrupole type mass spectrometers 10, 10a and 10b may be integrated and/or incorporated with other electric circuits, sensors, instruments, micro machines, and the like to form the system 1 (device, apparatus) for achieving a specific purpose or various objectives.

In the above, although the embodiments are described with reference to the mass analyzer having the quadrupole mass filter 30 with the quadrupole ion trap as the accumulator section 32, the mass analyzer may be equipped with other type of mass filter using electric and/or magnetic field such as a wien filter and the like, with a ion trap using electric and/or magnetic field such as a penning trap and the like. It is understood that other implementations may be utilized and structural changes may be made without departing from the scope of the present disclosure.

The emergence of miniature mass spectrometers is a major step forward toward deploying these chemical analysis instruments in the field. These devices are more and more integrated into industrial (semiconductor chip manufacturing, vacuum coating, drug discovery, petrochemical etc.) tools needed for real time monitoring and control in several inline applications. Autonomy, dependability, and minimum maintenance are key factors for more ubiquitous deployment of these devices. Miniaturized versions of mass spectrometers require however the same level of maintenance as their full size laboratory counterparts since they use common methodologies for ionization and detection. The limited lifetime associated with ionizers and the fragility and excessive calibrations requirements for detectors such as electron multipliers, MCPs, and PMTs are indeed exacerbated when one exploits the high pressure operation capability of these devices. Since they have been identified as the most amenable to miniaturization RF driven mass analyzers that are currently the workhorse behind the development of complete mass spectrometric systems intended for various applications. While they possess several attributes including small size, low power consumption, and moderate vacuum requirements, they suffer from performance shortcomings when compared to full size instruments.

In the present invention, a novel approach to enhancing performance, lowering cost, and minimizing downtime associated with maintenance and excessive calibrations is introduced. One of aspects of this invention includes the hybrid arrangement disclosed herein that combines linear quadrupole and ion trap into a single analyzer. A novel fabrication method is disclosed to assemble quadrupoles and trap arrays in series and onto a single chassis. The ion trap stage is intended, but not limited to, to serve as an ion amplifier by accumulating ions prior to ejecting them to a Faraday plate for fast charge detection.

The method of the hybrid analyzer described in this disclosure enhances the sensitivity of such a miniature device without relying on consumable components such as EMs, MCPs, CCDs, and PMTs. Straightforward Faraday detectors are sufficient since the ion amplification is performed by the ion trap array. The utilization of a non-consumable component such as the Faraday detector provides the hybrid analyzer with: 1. needed robustness, 2. infinite lifetime, and 3. lack of maintenance and calibration. Such attributes are critical for reliable, autonomous operation in the field.

In this specification, a miniaturized highly integrated hybrid mass analyzer suitable for field applications is disclosed. The invention represents a novel approach to enhancing performance and providing the robustness and the reliability required for long lasting field operation. The device and method combine spatial and temporal ion trapping into a single platform thus offering superior sensitivity and selectivity as well as mode of operation flexibility. In a preferred embodiment, a linear quadrupole array is interfaced with a cylindrical ion trap array intended to operate at the same or different RF frequencies. While the linear quadrupole stage acts as a mass filter, the ion trap can operate as an additional mass analysis stage or as an ion storage stage to enhance sensitivity. Such flexibility enables the use of Faraday detectors which possess unparalleled field attributes including ruggedness, infinite lifetime, and requiring no calibrations. A method of fabrication suitable for mass production of hybrid mass analyzers using glass-to-metal seal and accurate photoetched ionizer and electrode parts is disclosed. The construction method relies on assembling modular components resulting in various embodiments enabling the use of detectors such as electron multipliers, microchannel plates, and photomultiplier tubes.

One of the aspects of the above is a hybrid mass analyzer that comprises an ionizer, a quadrupole mass filter or a quadrupole array, an ion trap or an ion trap array wherein said ion trap consists of a cylindrical ion trap array, and at least one ion detector. In one embodiment, the cylindrical trap array consists of three plates: one top endcap, one ring electrode, and one bottom endcap. In another embodiment the rods of quadrupole array act as the ring electrodes to form higher storage capacity rectilinear traps. A device that includes the mass analyzer may comprise modular components that result in at least one embodiment. The device may operate the quadrupole and ion trap stages at the same or different RF frequencies. The device may use modular components for ion detection including Faraday, electron multiplier, and photomultiplier tubes.

Another aspect of the above is a hybrid mass analyzer method that comprises an ionizer, a quadrupole mass filter or a quadrupole array, an ion trap or an ion trap array, and at least one ion detector. The method may use a two stage mass filtering for enhanced selectivity. The method may use the ion trap stage for accumulating ions for enhanced sensitivity. The method may operate the quadrupole and ion trap stages at the same or different RF frequencies and voltages. The method may use at least one cycle of accumulating and ejecting ions toward the detector for collection. The method may comprise ion optics means for efficiently transferring ions from the quadrupole stage to the ion trap stage.

Yet another aspect of the above is a non-transitory computer readable medium storing software for controlling operation, detection and analysis processes. The software comprises: (i) executable code that controls ionizing of a sample entering the hybrid mass analyzer device; (ii) executable code that scans at least one set of RF voltages for the operation of the quadrupole and ion trap stages of the hybrid mass analyzer device; and (iii) executable code that controls at least one voltage pulse of the bottom endcap electrode of the ion trap, wherein the controlling selectively gates ions for accumulation prior to collection by an ion detector that is coupled downstream from the ion trap stage of the hybrid mass analyzer. The software may further comprise executable code that controls operations in connection with at least two operational modes corresponding to operations of the quadrupole and ion trap stages of the hybrid mass analyzer device. The software may further include executable code to control of the at least one voltage pulse to the bottom endcap electrode of the ion trap, wherein the controlling selectively gates ions for accumulation prior to collection by an ion detector that is coupled downstream from the ion trap stage of the hybrid mass analyzer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A mass analyzer comprising:
   an ionizer for generating ions from a sample;
   a mass filter with an accumulator section that is integrated with a filter section of the mass filter by fixing the filter section and the accumulator section on a single glass chassis so that the filter section and the accumulator section are aligned to filter ions in the filter section and accumulate the filtered ions in the accumulator section prior to ejecting the filtered ions from the mass filter; and
   an ion detector that is configured to detecting ejected ions from the mass filter.

2. The mass analyzer according to claim 1, wherein the mass filter includes a quadrupole array and the accumulator section includes an ion trap array.

3. The mass analyzer according to claim 2, wherein the ion trap array includes a cylindrical ion trap array.

4. The mass analyzer according to claim 3, wherein the cylindrical ion trap array includes a top endcap plate, a ring electrode plate and a bottom endcap plate.

5. The mass analyzer according to claim 2, wherein rods of the quadrupole array act as ring electrodes of the ion trap array.

6. The mass analyzer according to claim 1, further comprises a module that is configured to control the mass analyzer in two modes, wherein a first mode of the two modes is ejecting the filtered ions through the accumulating section without accumulating prior to ejecting from the mass filter, and a second mode of the two modes is accumulating the filtered ions in the accumulator section prior to ejecting from the mass filter.

7. The mass analyzer according to claim 1, further comprises a module that is configured to provide a same electric or magnetic field to the accumulator section as that provided to the mass filter.

8. The mass analyzer according to claim 1, further comprises a module that is configured to provide a different electric or magnetic field to the accumulator section than that provided to the mass filter.

9. The mass analyzer according to claim 1, wherein the single chassis is configured to integrate the ionizer, the mass filter and the ion detector.

10. The mass analyzer according to claim 1, further comprises a modular component that is configured to assemble any one of the ionizer, the mass filter and the ion detector.

11. The mass analyzer according to claim 1, wherein the ion detector includes a Faraday detector.

12. A system comprising:
    the mass analyzer according to claim 1; and
    a module that is configured to use an output from the mass analyzer.

13. The system according to claim 12, wherein the module includes an output unit that is configured to output an information relating to the sample detected by the mass analyzer.

14. A method that includes controlling a mass analyzer that comprises an ionizer for generating ions from a sample, a mass filter with an accumulator section integrated with a filter section of the mass filter by fixing the filter section and the accumulator section on a single glass chassis, an ion detector for detecting ejected ions from the mass filter, and a controller that is configured to control an electric or magnetic field provided to the mass filter and the accumulator section, wherein the controlling the mass analyzer includes:
    controlling the filter section and the accumulator section individually using the controller via a plurality of pins for electrical connection through the chassis; and
    accumulating, filtered ions in the accumulator section prior to ejecting from the mass filter.

15. The method according to claim 14, wherein the controlling the mass analyzer further includes:
    ejecting, using the controller, the filtered ions through the accumulating section without accumulating prior to ejecting from the mass filter.

16. The method according to claim 14, wherein the controlling the mass analyzer further includes:
    providing, using the controller, a same electric or magnetic field to the accumulator section as that provided to the mass filter.

17. The method according to claim 14, wherein the controlling the mass analyzer further includes:
    providing, using the controller, a different electric or magnetic field to the accumulator section than that provided to the mass filter.

18. The method according to claim 15, further comprising:
    performing a first scan of a set of mass to charge ratios using the mass analyzer with a first mode including the ejecting; and
    performing a second scan of the set of mass to charge ratios using the mass analyzer with a second mode including the accumulating.

19. A nontransitory computer program product for a computer to operate a system including a mass analyzer that comprises an ionizer for generating ions from a sample, a mass filter with an accumulator section integrated with a filter section of the mass filter by fixing the filter section and the accumulator section on a single glass chassis, and an ion detector for detecting ejected ions from the mass filter, wherein the computer program includes executable codes for performing steps of:
- a first scan of a set of mass to charge ratios controlling the mass analyzer via a plurality of pins for electrical connection through the chassis with a first mode including ejecting filtered ions through the accumulating section without accumulating prior to ejecting from the mass filter; and
- a second scan of the set of mass to charge ratios controlling the mass analyzer via the plurality of pins with a second mode including accumulating the filtered ions in the accumulator section prior to ejecting from the mass filter.

20. The mass analyzer according to claim 1, further comprising a plurality of pins for electrical connection for controlling the filter section and the accumulator section through the chassis.

\* \* \* \* \*